(12) United States Patent
Slaughter

(10) Patent No.: US 7,743,781 B2
(45) Date of Patent: Jun. 29, 2010

(54) RECONFIGURABLE PORTABLE HUNTING BLIND

(76) Inventor: Jerry Micah Slaughter, 1304 Sam Houston Ave., Ste. B, Huntsville, TX (US) 77340

( * ) Notice: Subject to any disclaimer, the term of this patent is extended or adjusted under 35 U.S.C. 154(b) by 248 days.

(21) Appl. No.: 11/708,801

(22) Filed: Feb. 21, 2007

(65) Prior Publication Data
US 2007/0193612 A1 Aug. 23, 2007

Related U.S. Application Data

(60) Provisional application No. 60/775,092, filed on Feb. 21, 2006.

(51) Int. Cl.
*E04H 15/58* (2006.01)
(52) U.S. Cl. .................. 135/117; 135/121; 135/901; 52/82; 52/71; 160/135
(58) Field of Classification Search ........... 135/121, 135/117, 119, 901, 87, 143, 153; 43/1; 160/135, 160/351; 52/63, 71, 82–83, 239
See application file for complete search history.

(56) References Cited
U.S. PATENT DOCUMENTS

| | | | | |
|---|---|---|---|---|
| 459,764 A * | 9/1891 | Orr, Sr. | .......................... | 52/63 |
| 2,928,404 A * | 3/1960 | Klages | .......................... | 135/98 |
| 2,967,534 A * | 1/1961 | Silye | .......................... | 135/143 |
| 3,169,543 A * | 2/1965 | McGerty | .......................... | 135/152 |
| 3,550,601 A * | 12/1970 | Peters | .......................... | 135/152 |
| 3,996,706 A * | 12/1976 | Bomgaars | .......................... | 52/71 |
| 4,067,346 A * | 1/1978 | Husted | .......................... | 135/153 |
| 4,129,139 A * | 12/1978 | Powers | .......................... | 135/156 |
| 4,640,061 A * | 2/1987 | Trumley | .......................... | 52/71 |
| 4,777,755 A * | 10/1988 | Colburn | .......................... | 43/1 |
| 5,352,149 A * | 10/1994 | Melashenko et al. | .......................... | 446/478 |
| 5,802,778 A * | 9/1998 | Thorp et al. | .......................... | 52/36.2 |
| 6,532,701 B2 * | 3/2003 | Williams | .......................... | 52/71 |
| 6,941,961 B1 * | 9/2005 | Eastman, II | .......................... | 135/121 |
| 6,942,065 B1 * | 9/2005 | Price | .......................... | 182/187 |
| 7,168,522 B1 * | 1/2007 | Price | .......................... | 182/141 |
| 2006/0249640 A1 * | 11/2006 | Hanson | .......................... | 248/214 |

\* cited by examiner

*Primary Examiner*—Winnie Yip
(74) *Attorney, Agent, or Firm*—John R Casperson

(57) ABSTRACT

A portable reconfigurable hunting blind assembly is disclosed comprising six rectangular frames joined together side edge to side edge along five hinge lines for accordion folding, and a camouflage covering mounted to each of the frames to define six panel-shaped wall units, the camouflage covering defining a window in at least some of the wall units.

7 Claims, 12 Drawing Sheets

RECONFIGURABLE PORTABLE HUNTING BLIND

CROSS REFERENCES TO RELATED APPLICATIONS

This application claims the benefit of U.S. Provisional Application No. 60/775,092 filed Feb. 21, 2006, the disclosure of which is herein incorporated by reference.

FIELD OF THE INVENTION

The invention relates to a reconfigurable portable hunting blind.

BACKGROUND OF THE INVENTION

A lack of flexibility in the various ways a blind can be deployed is a shortcoming of blinds constructed according to the prior art.

Two hunters need a bigger blind than a single hunter. Deer hunters are best served with a windowed blind, while waterfowl hunters are best served by an open-topped blind. A bow hunter requires a differently shaped window than a rifleman. Hunters facing open areas can be well served by a blind which is open toward the back. A blind which can be reconfigured to meet all of these needs would be very desirable.

Prior art portable blinds often have no roof, or an inadequate roof. For deer hunting, a roof is desirable, as it darkens the inside of the blind, making detection of the blind occupants less likely. A waterproof roof is even more desirable, as it shelters the occupants from the sun and rain, making it easier for them to remain still.

Also, prior art blinds are often complicated to assemble, and can have many parts. A blind which is easy and fast to assemble, requires no tools, and has few parts would be very desirable.

Weight is also a factor in the desirability of a blind. A portable blind which is lightweight is easier to transport, and thus better suited for its intended purpose.

Transport size is also an important factor for a portable blind. A blind which collapses to a small size is easier to carry and transport, and thus better suited for its purpose.

Another factor for the desirability of a blind is structural stability. A blind which is structurally stable can provide a rifleman or a cameraman with a solid rest, enabling more accurate shots or photos.

Another factor for a blind is ease of repair. A blind which has parts which are easily replaced can easier to repair and can also be readily modified to better blend in with its environment.

Another factor is wheelchair accessibility. A blind which is easily accessible to hunters in wheelchairs would be very desirable.

It is an object of the invention to provide a blind, which, in its preferred embodiments, meets the foregoing needs.

SUMMARY OF THE INVENTION

In one embodiment, the invention provides a portable reconfigurable hunting blind assembly comprising six rectangular frames joined together side edge to side edge along five hinge lines for accordion folding, and a camouflage covering mounted to each of the frames to define six panel-shaped wall units, the camouflage covering defining a window in at least some of the wall units.

DETAILED DESCRIPTION OF THE INVENTION

Figure 1:
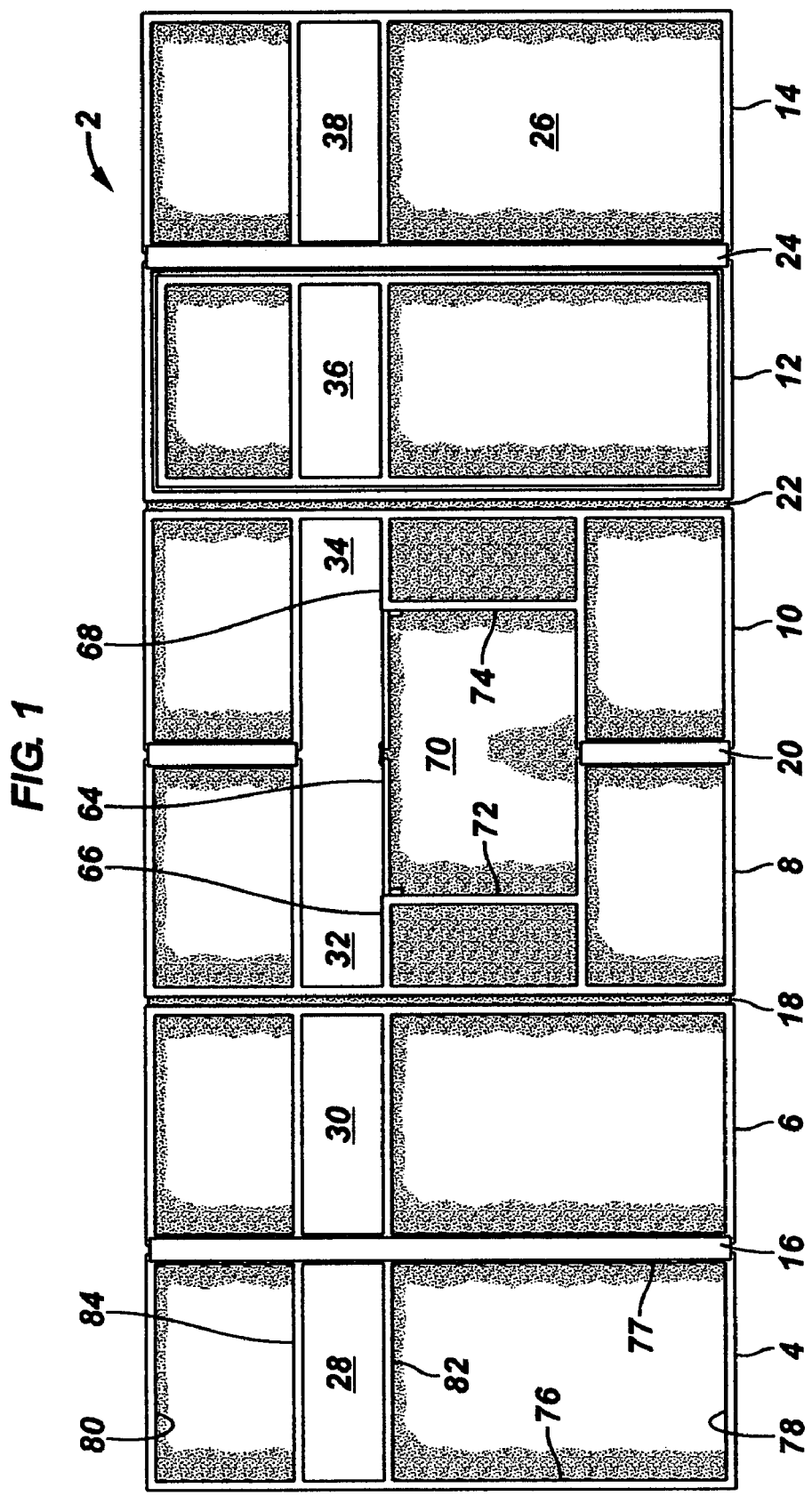
FIG. 1 is a plan view of a hunting blind assembly in a flat arrangement according to an embodiment of the invention.

In one embodiment, as best shown in FIG. 1, the invention provides a portable reconfigurable hunting blind assembly 2 comprising six frames 4, 6, 8, 10, 12, 14, at least some of which are generally rectangular, joined together side edge to side edge along five hinge lines 16, 18, 20, 22, 24 for accordion folding, and a camouflage covering material 26 mounted to each of the frames to define six panel-shaped wall units, the camouflage covering material defining a window in at least some of the wall units, preferably windows 28, 30, 32, 34, 36 and 38, one in each of the wall units. Each wall unit is preferably rectangular, and can measure about two feet by 5 feet, for example.

The frames can be identified as a first frame 4 on a first end of the hunting blind assembly, a second frame adjacent to the first frame 6, a third frame 8 adjacent to the second frame, a fourth frame 10 adjacent to the third frame, a fifth frame 12 adjacent to the fourth frame, and a sixth frame 14 adjacent to the fifth frame, the sixth frame forming a second end of the hunting blind assembly. The blind herein described is or can be easily made to be wheelchair accessible between the first end and the second end of the assembly.

The frames are preferably attached by hinges along the five hinge lines. The hinges can be identified as a first hinge 16 between the first and second panels, a second hinge 18 between the second and third panels, a third hinge 20 between the third and fourth panels, a fourth hinge 22 between the fourth and fifth panels, and a fifth hinge 24 between the fifth and sixth panels.

To increase the number of possible configurations, the blind is capable of being turned inside out.

Figure 2:
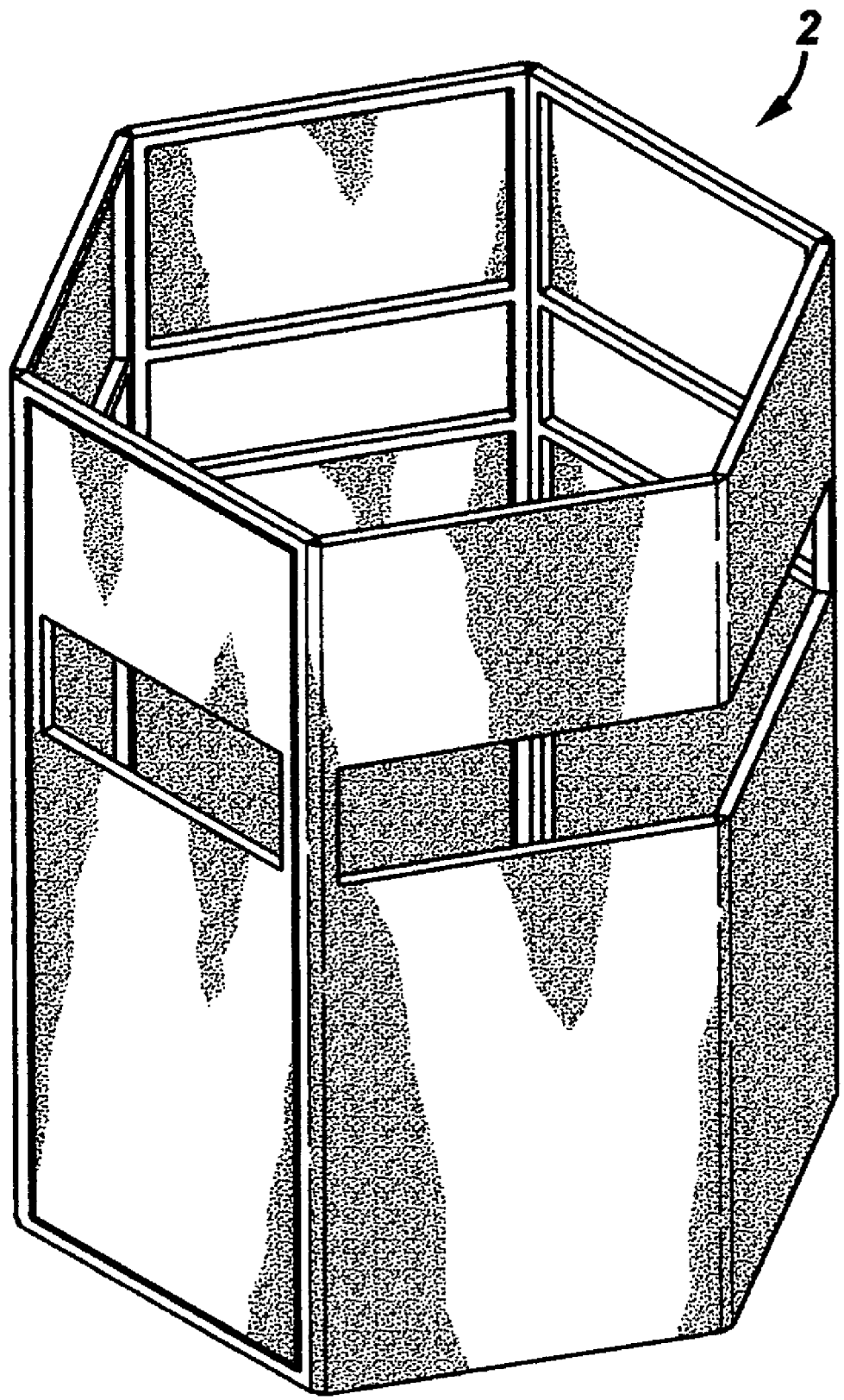
FIG. 2 is a pictorial view of the blind assembly of FIG. 1 configured to form a standing structure of hexagonal cross section, for use for example by a single rifle hunter.
Figure 3:
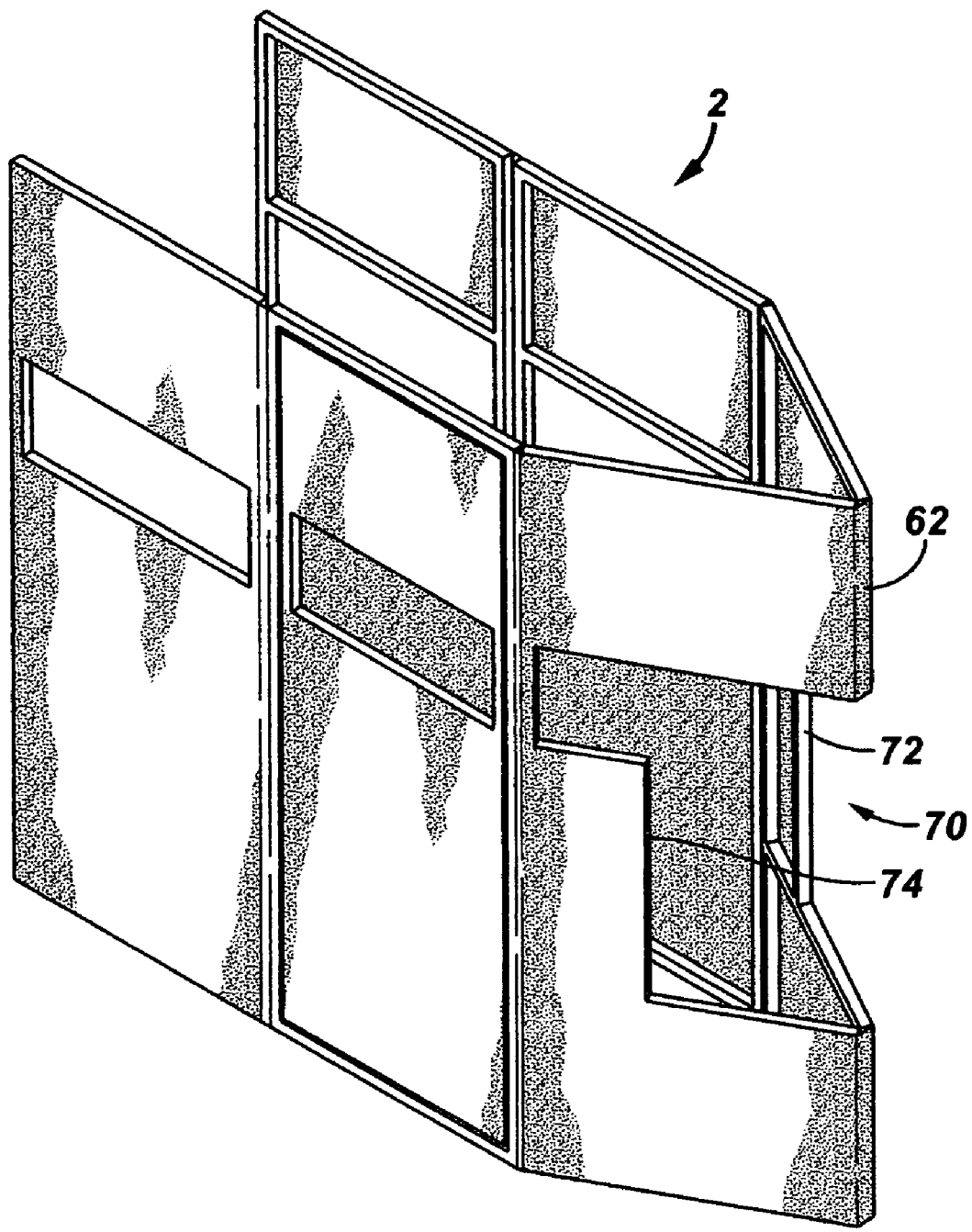
FIG. 3 is a pictorial view of the blind assembly of FIG. 1 configured to form a standing structure of open-ended pentagonal configuration, for use, for example by a single bow hunter.
Figure 4:
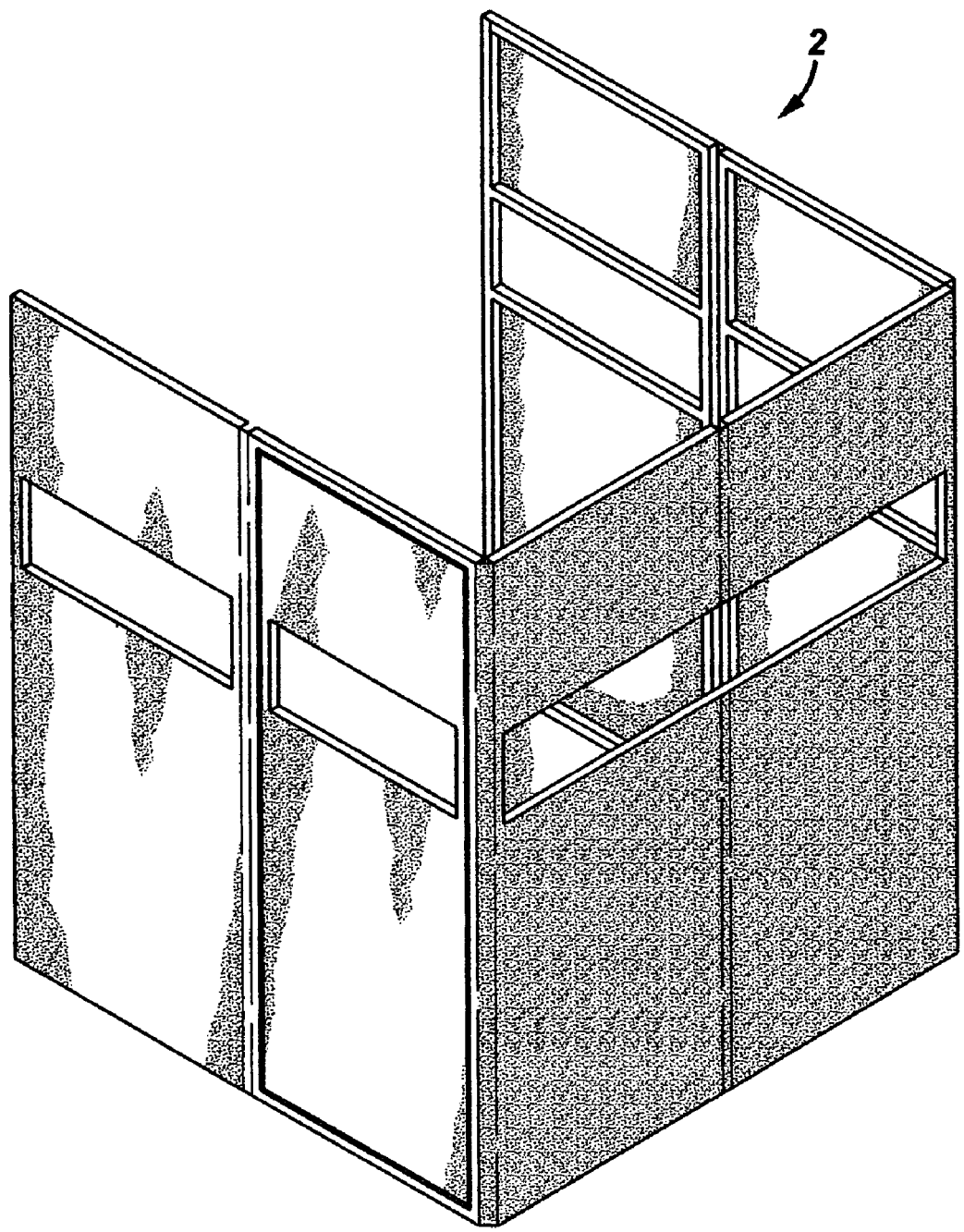
FIG. 4 is a pictorial view of the blind assembly of FIG. 1 configured to form a standing structure of open-ended square configuration, for use, for example, by a pair of rifle hunters.
Figure 5:
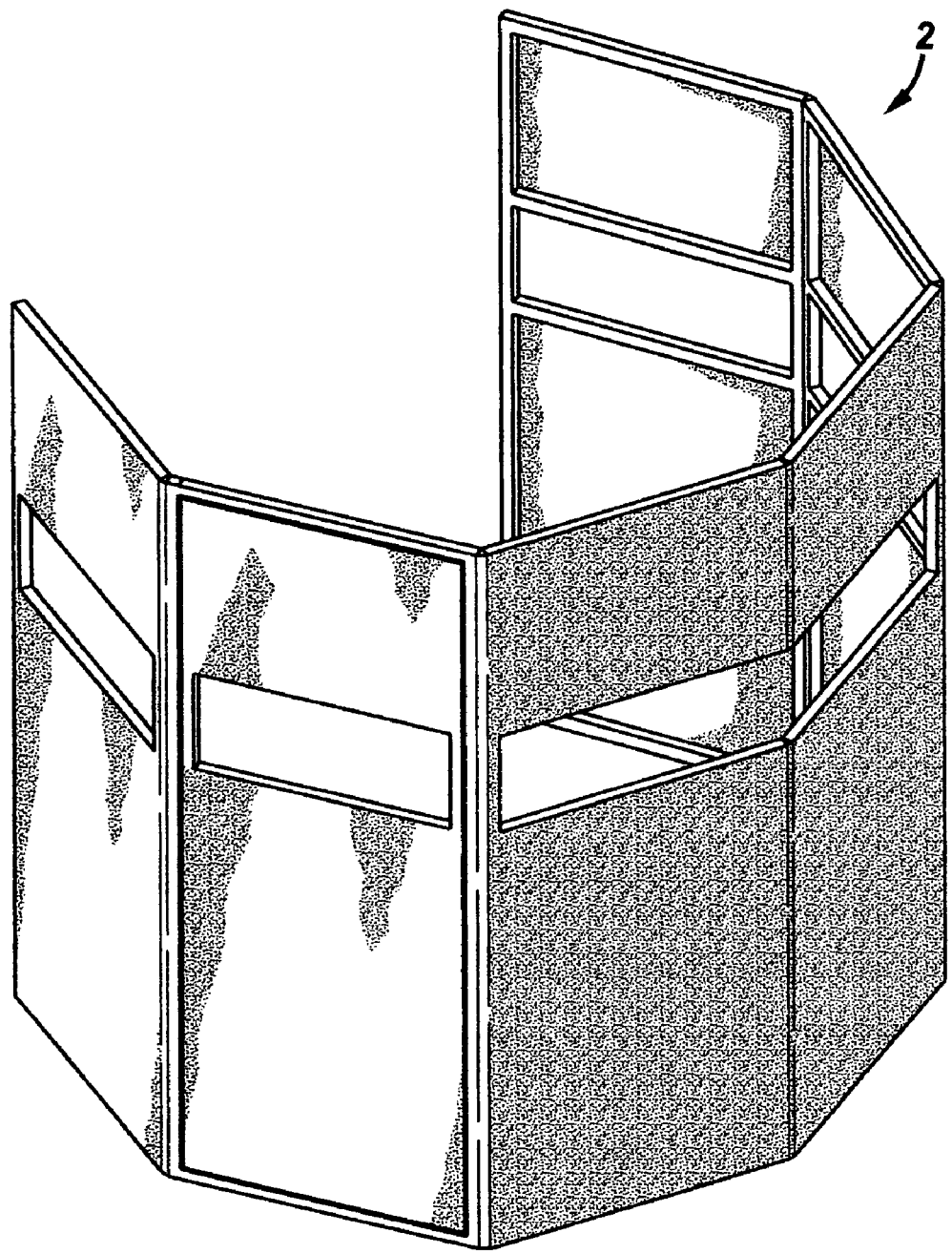
FIG. 5 is a pictorial view of the blind assembly of FIG. 1 configured to form a standing structure of open ended hexagonal configuration, for use, for example, by a group of hunters.

For example, the blind, when in the configuration shown by FIG. 2 or 3, is right side out, and when in the configurations shown in FIG. 4 or 5, is inside-out. Therefore, at least the second hinge 18 permits the second frame and the third frame to swing over an angle of at least 270 degrees with respect to each other and the fourth hinge 22 permits the fourth and fifth frames to swing over an angle of at least 270 degrees with respect to each other.

The frame and hinge means can be constructed of metal or plastic. In a preferred embodiment, the frame is constructed of aluminum and the hinge means is constructed of a neoprene strip. The aluminum is preferably constructed of square tubing (one inch square tubing has been used with good results) and the neoprene strip is attached to the tubing with an adhesive. Polychloroprene based contact cement has been used with good results, together with 2½ inch wide neoprene for the hinges 18 and 22 and 1½ inch wide neoprene for the hinges 16, 20 and 24. The second frame is separated from the third frame by a distance about the same as the thickness of the tubing. The fourth frame is separated from the fifth frame by a distance about the same as the thickness of the tubing. The spacing between the remaining frames can be less.

If desired, one of the frames can further define a door 40. More preferably, the frame defining the door is selected from the second frame 6 and the fifth frame 12. In the illustrated embodiment, frame 12 carries the door 40. The frame 12 is rectangular, and the door is mounted to the hinge with a neoprene strip. The hinge side of the door can be constructed of square tubing, whereas angle can be used in the remainder of the frame with good results. A velcro latch assembly can be provided opposite the hinge side to keep the door in the closed position when desired. The latch is preferably adjacent one of the end panels.

Figure 13:
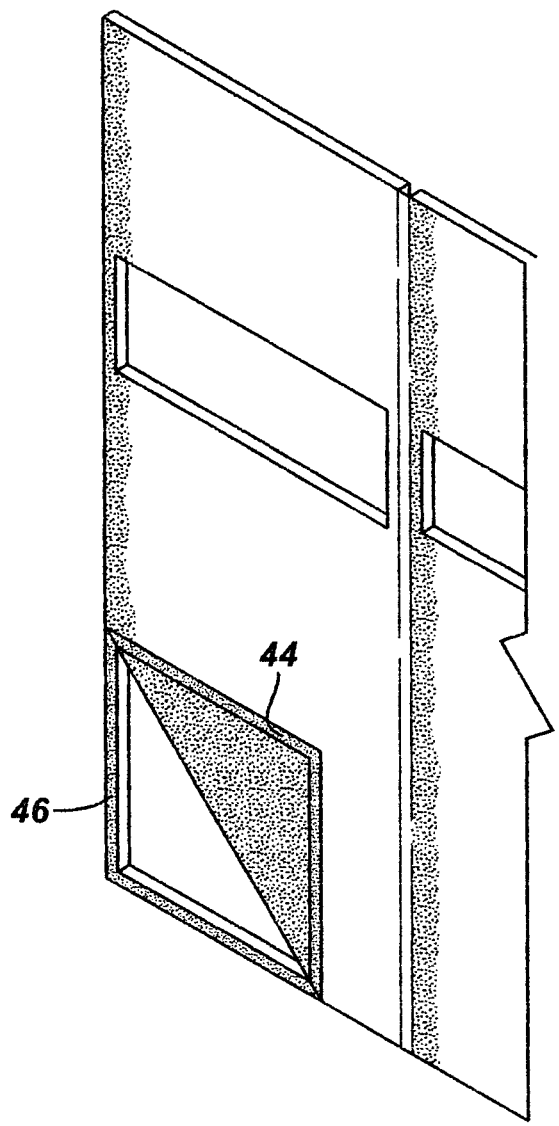
FIG. 13 is a detail of a portion of the outside of the blind assembly as shown in FIG. 4, for example, showing construction details.

The portable reconfigurable hunting blind assembly is configurable into a self-standing closed hexagonal structure (FIG. 2) and is reconfigurable into a self-standing three sided open-ended square structure. (FIG. 4). This is accomplished by turning the blind inside out. The open end of the blind in the various open-ended forms can be closed with a curtain such as curtain 42 or 43 if desired. An inside surface of the hexagonal structure forms an outside surface of the open-ended square structure. To accomplish the transfiguration, a camouflage covering can be mounted on both sides of each frame, or single coverings, preferably fabric, releasably fastened such as by Velcro fasteners on the front side and on the back side for removal and repositioning. See FIG. 13, which illustrates a covering having Velcro strips 44 around its inside periphery which attach to Velcro strips 46 mounted to the inside facing and outside facing peripheries of the frame, or the neoprene strip if present. If desired, however, the covering for the panels can be formed from a polyolefin sheeting having structural rigidity. For example, polyolefin sheeting formed from inner and outer sheets connected by an undulating webbing sheet, such as Coraplast sheeting, is expected to provide good results.

In the hexagonal configuration, (FIG. 2) the blind accommodates a single hunter. In the open-ended square configuration, (FIG. 4) the blind accommodates two hunters. FIG. 2 also illustrates how an end panel of the blind can be swung open to permit wheelchair access.

Figure 7:
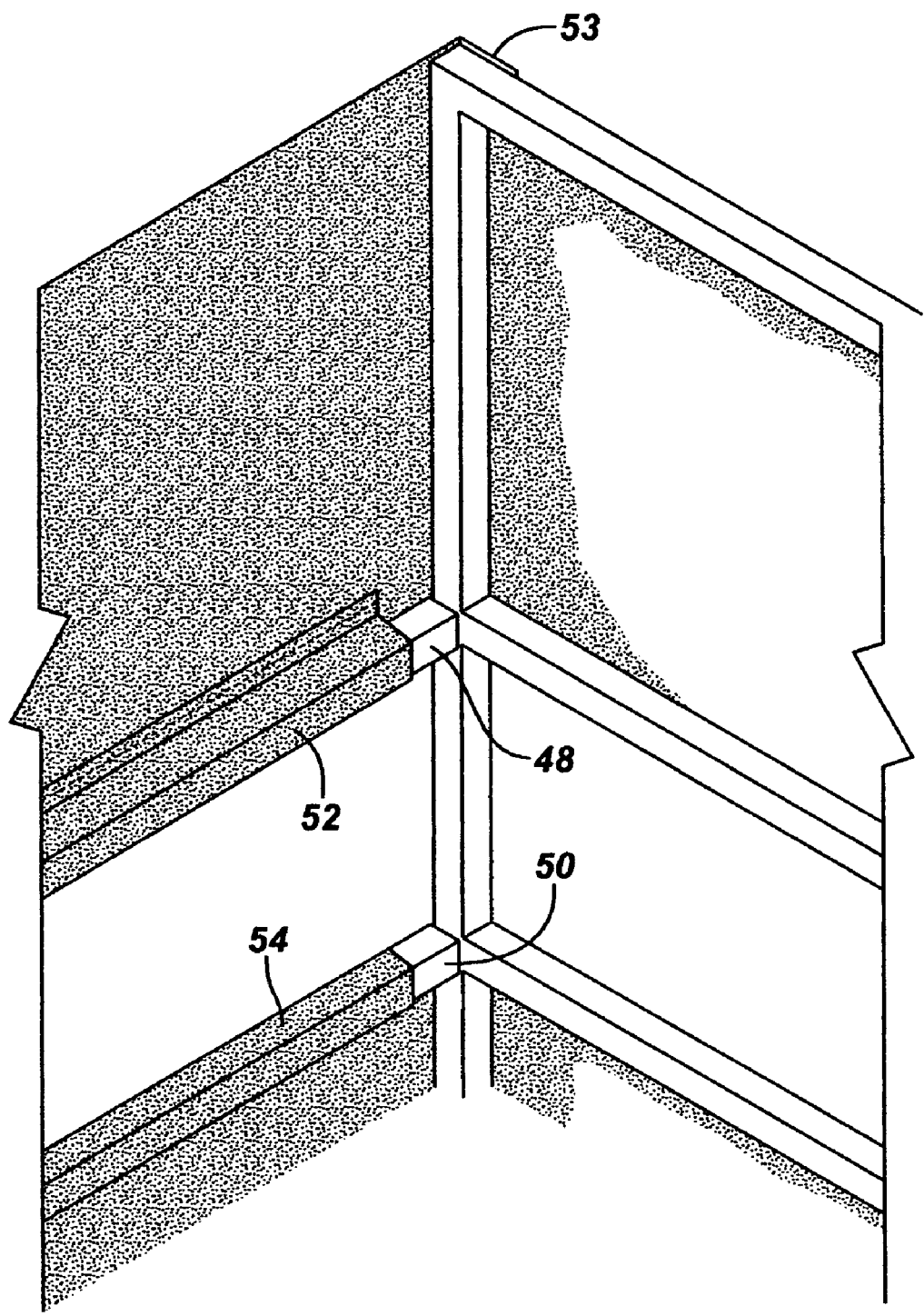
FIG. 7 is a detail of a rear covering for the blind as configured in FIG. 3, 4 or 5.
Figure 8:
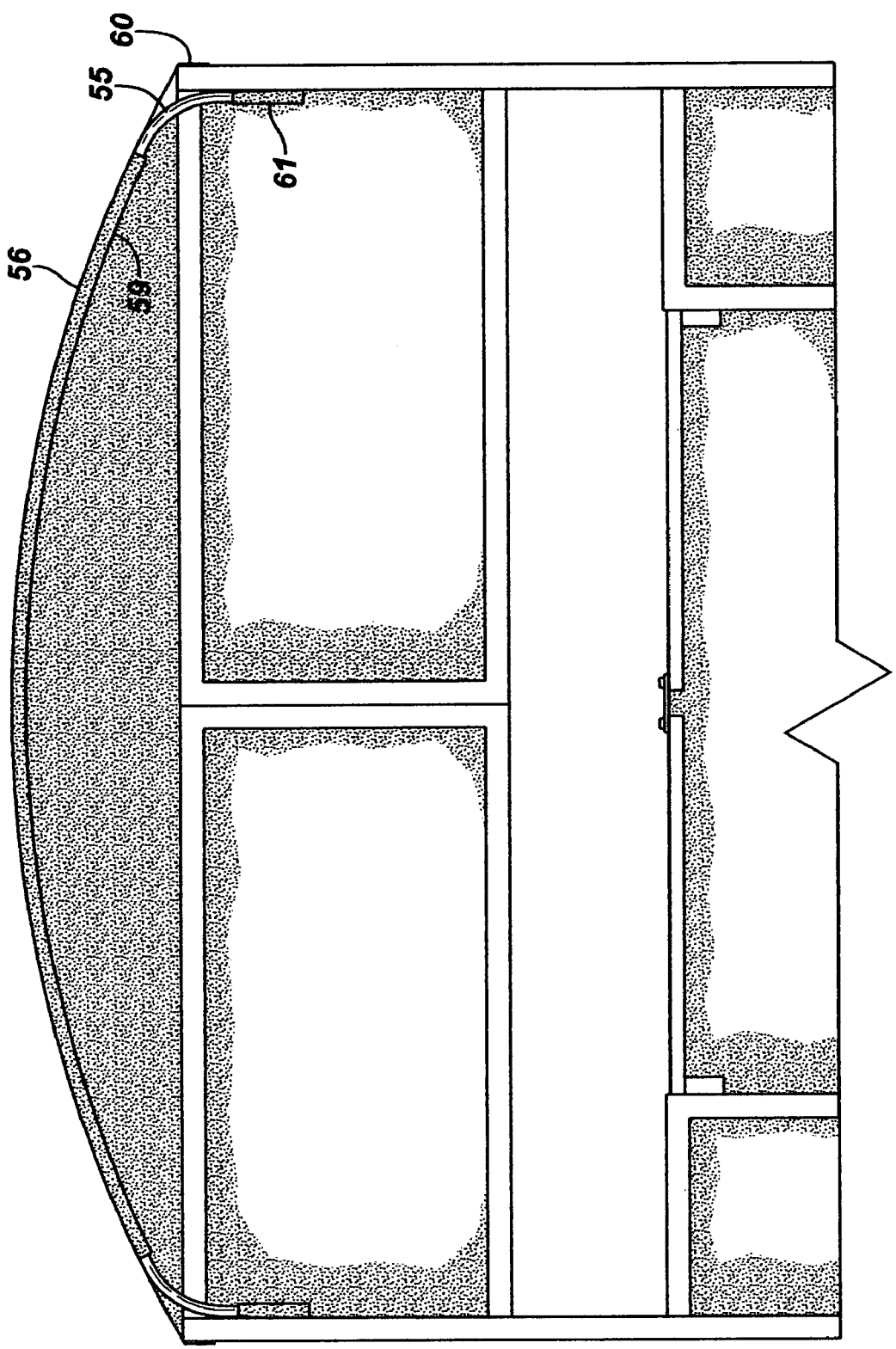
FIG. 8 is a detail of a top covering for the blind as configured in FIG. 2, 3, or 4.

The portable reconfigurable hunting blind assembly can be described as having an upper end and a lower end. In a preferred embodiment, (see FIG. 7) a first removable stiffener 48 is provided for extending across the open end of the hunting blind assembly when configured as an open-ended square structure and a second removable stiffener 50 for extending across the open end of the structure end when the hunting blind assembly is configured as an open-ended square structure. A back curtain 42 can be attached across the opening if desired and the stiffeners 48 and 50 carried by tubular pockets 52, 54 extending across the curtain. Preferably, the fabric curtain is attached along one at least one of its sides 53 to the outer surfaces of the end panels by fasteners, preferably Velcro, and the stiffeners are square tubing of the same size used in the frames to provide structural rigidity.

Figure 9:
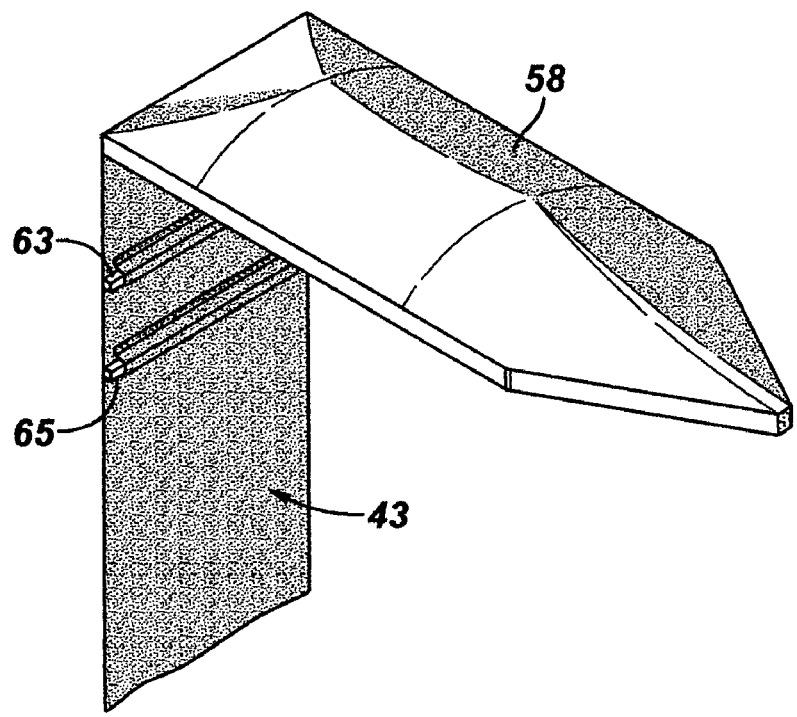
FIG. 9 is perspective view of a top covering for the blind when configured as shown in FIG. 3.
Figure 10:
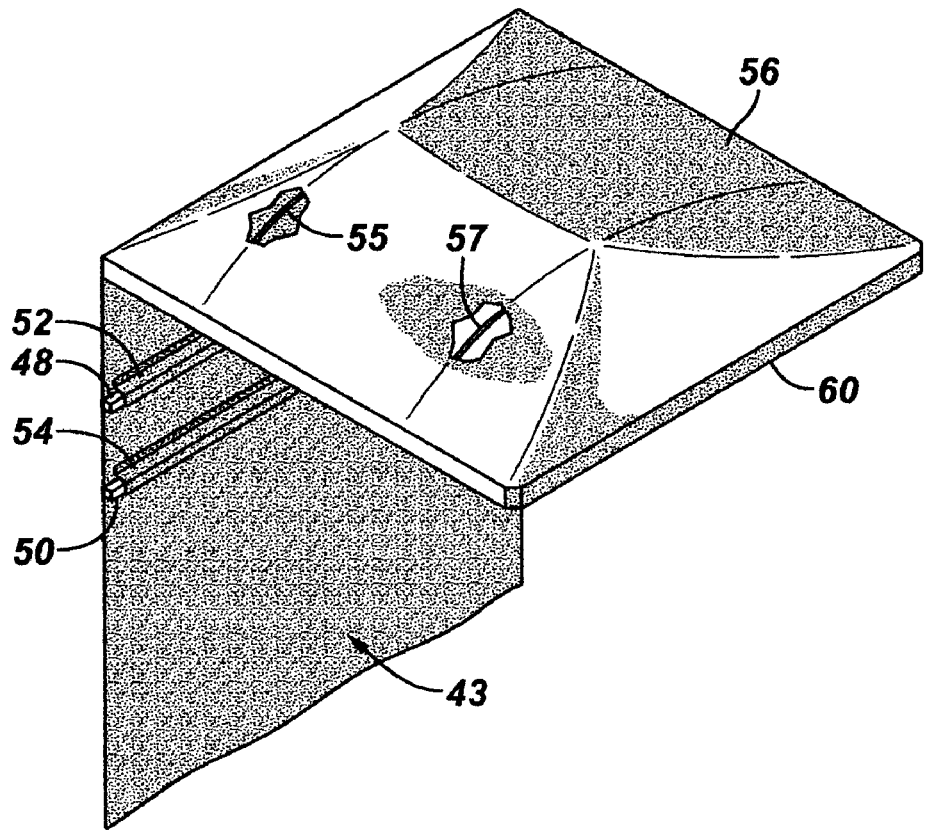
FIG. 10 is a perspective view of a top covering for the blind when configured as shown in FIG. 4.

Also, for the purposes of providing a roof, a plurality of different polygonal coverings, preferably fabric, examples of which are shown in FIGS. 9 and 10 can be provided. A generally square covering 56 is provided for the blind configuration in FIG. 4. A generally pentagonal covering 58 is provided for the blind configuration in shown in FIG. 3. A generally hexagonal covering (not shown) would be provided for the blind configuration in FIG. 2. If desired, an optional foldable hard roof unit can be positioned on the upper end of the structure, and this may be especially desirable for the unit when in the square configuration. The foldable roof unit comprises at least two panels foldably joined together along a hinge line and coming together with the upper end of the structure when in an unfolded configuration.

The back curtain can depend from a rearward edge of the roof. As shown in FIG. 10, back curtain 42 depends from a rearward edge of roof covering 56. As shown in FIG. 9, back curtain 43 depends from a rearward edge of roof covering 58.

Figure 14:
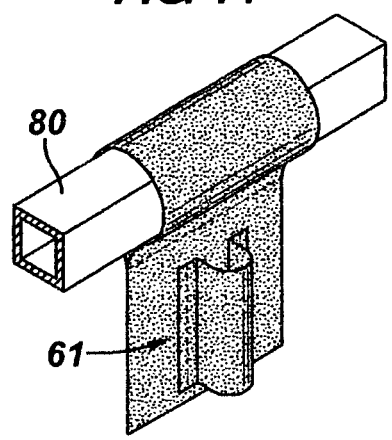
FIG. 14 is a detail of a portion of an upper part of the blind assembly as shown in FIG. 4, for example, showing construction details.

The roof coverings preferably carry at least two flexible rods slightly longer than the gap to be bridged by them in tubular pockets 59 formed on the bottom side of the covering. For example, in FIG. 10, rods 55 and 57 are carried on the underside of covering 56. About their periphery, the coverings are provided with a fastener lined lip (for example lip 60 in FIG. 10) which attaches to outwardly facing fasteners on the upper ends of the panels. Preferably, the fasteners are hook and loop fasteners, for example, Velcro brand fastener strips. A covering can then be provided positioned over the roof frame to form a roof. The covering has a periphery, a top side, and a bottom side, and a plurality of fasteners positioned on the bottom side around the periphery for attachment to a plurality of fasteners located on an outside surface of the hunting blind assembly near the upper end. Because the structure is designed to invert, a plurality of fasteners for the roof can be provided on both an outside and on an inside surface of the assembly near the upper end, or, alternatively, on an outer face of the fabric covering which is repositioned when the structure is turned inside out. Also, since the required dimensions of the covering depend on the configuration of the assembly, it is desirable to provide a plurality of coverings sized to fit the various configurations. To install the roof covering, the rods are bowed upwardly in the center and the ends of the rods are inserted into pockets 61 carried on at least some of the top plates 80. See FIG. 14. The roof covering is then peripherally attached to the outer surface of the panels.

The portable reconfigurable hunting blind which is configurable into a self-standing closed hexagonal structure is also preferably reconfigurable into a self-standing four sided open ended pentagonal structure having two parallel sides leading to the open end. See FIG. 3. In this configuration, the third and fourth frames meet at an acute angle to form a point 62 opposite from the open end when the blind is positioned in the configuration of a self-standing four sided open ended pentagonal structure.

Figure 6:
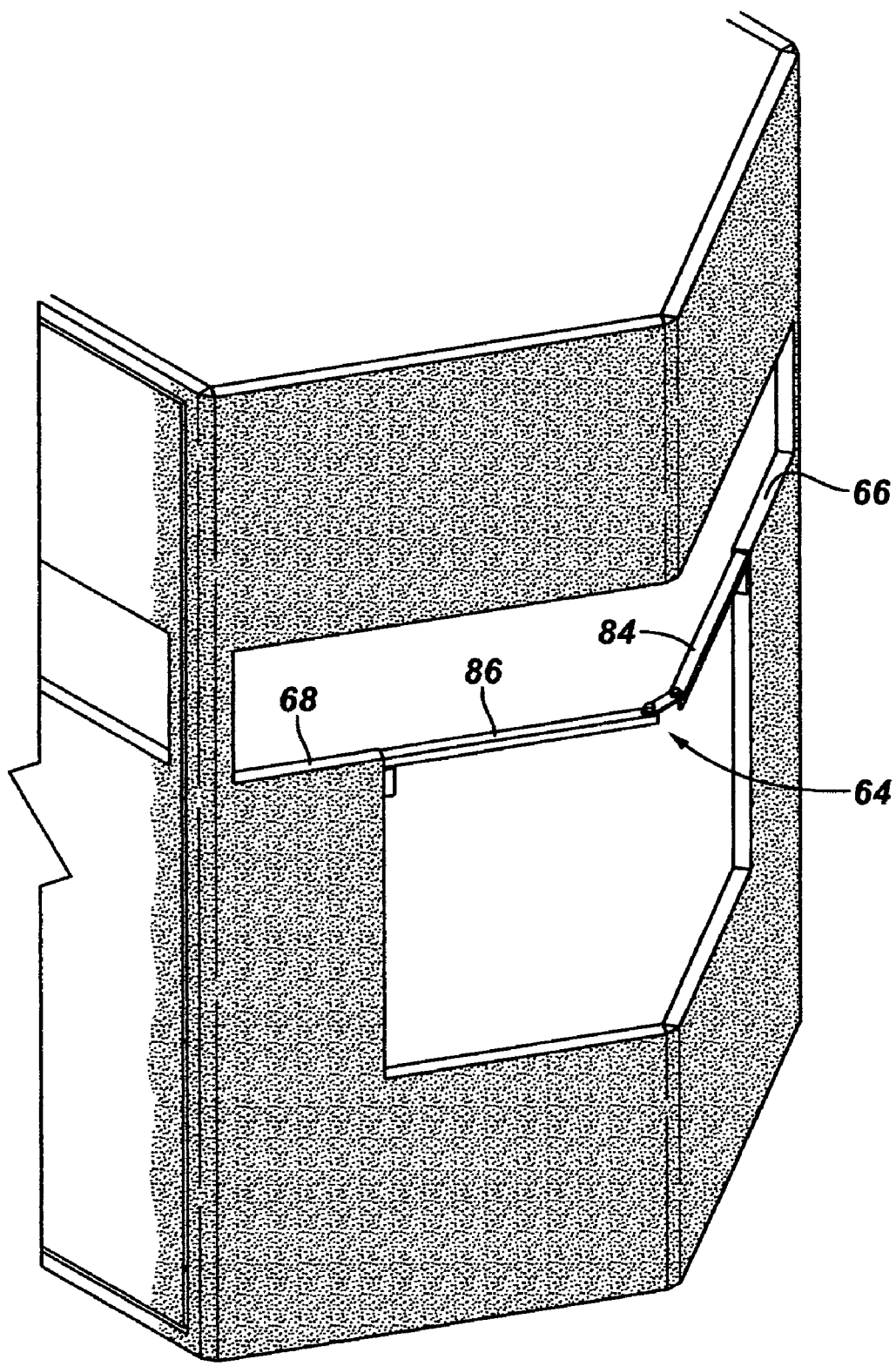
FIG. 6 is a detail of a portion of blind configured as shown in FIG. 3.

The third and forth frames preferably meet to form a rectangularly shaped window having a bottom edge partly formed by a removable rough sill element 64 (See FIG. 6) connected to fixed rough sill elements 68 in the third frame and the fourth frame. The open end of the blind is opposite from the point. When the removable rough sill element has been removed, the third and fourth frames meet to form a T shaped window frame 70 (See also FIG. 1) having a downward extension defined between fixed sill elements 72, 74 in the third frame and fourth frame. A flap (corresponding to the size of frame 70 in FIG. 1) is formed in the camouflage covering beneath the removable rough sill element to permit a window to be opened extending downwardly once the rough sill element has been removed. The T-shaped window facilitates bow hunting from the blind.

Preferably, there is provided a first removable stiffener 63 for extending across the open end of the hunting blind assembly when configured as an open ended pentagonal structure and a second removable stiffener 65 for extending across the open end of the structure when the hunting blind assembly is configured as an open ended pentagonal structure. A covering 43 can be provided across the back opening if desired, and the covering preferably carries the stiffeners. The covering preferably depends from the rearward edge of the roof covering 58. See FIG. 9.

The hunting blind assembly preferably comprises a covering positioned over a roof frame to form the roof. The covering preferably carries the roof frame. The frame preferably comprises at least two flexible rods, for example, fiberglass rods. The frame is located when the roof is attached. The covering has a periphery, a top side, and a bottom side, and a plurality of fasteners positioned on the bottom side around the periphery for attachment to a plurality of fasteners located on an outside surface of the hunting blind assembly near the upper end. Pluralities of fasteners are preferably located on an outside and on an inside surface of the assembly near the upper end.

In FIG. 1, at least some of the frames can be described as comprising a first vertically positioned king stud element 76 running up one side of the panel and a second vertically positioned king stud element running up the other side of the panel. A sole plate element 78 runs horizontally along a bottom side the panel and is connected at a first end to a bottom end of the first king stud element and at a second end to a bottom end of a second king stud element. A top plate element 80 runs horizontally along a top side of the panel and connected at a first end to a top end of the first king stud element and at a second end to the top end of the second king stud element. A rough sill element 82 runs horizontally across a mid section of the panel and is connected at a first end to the first king stud element and at a second end to the second king stud element. A lintel element 84 runs horizontally across a mid section of the panel and is connected at a first end to the first king stud element and at a second end to the second king stud element. The lintel element is positioned between the rough sill element and the top plate element. This construction may be used for the frames other than those defining the door and the bow-hunter's window.

The frames forming the bow-hunter's window are preferably of different construction. The third and fourth frames are preferably mirror images of each other and are positioned in a face to face orientation. The rough sill element 66 in the third frame is shorter than the rough sill element in the second frame, assuming the door is not in the second frame. The rough sill element 68 in the fourth frame is shorter than the rough sill element in the fifth frame, assuming the door is not in the fifth frame. The removable rough sill element 74 connects the third frame to the fourth frame. See FIG. 6.

The removable rough sill element comprises a first arm section 84 having a first end and a second end and a second arm section 86 having a first end and a second end. The first end of the first arm section is pivotally connected to the first end of the second arm section. A link element connecting the two arms has been used with good results. The second ends of both the first arm section and the second arm section are removably mounted to short rough sill elements or cripple elements in the third frame and fourth frame, respectively. In a preferred embodiment, rectangular receivers are positioned on the upper end of cripple elements defining the sides of the lower portion of the bow-hunter's window, and rectangularly cross sectioned mounting bosses extending transversely from the outer ends of the arms are closely received by the receivers.

Figure 11:
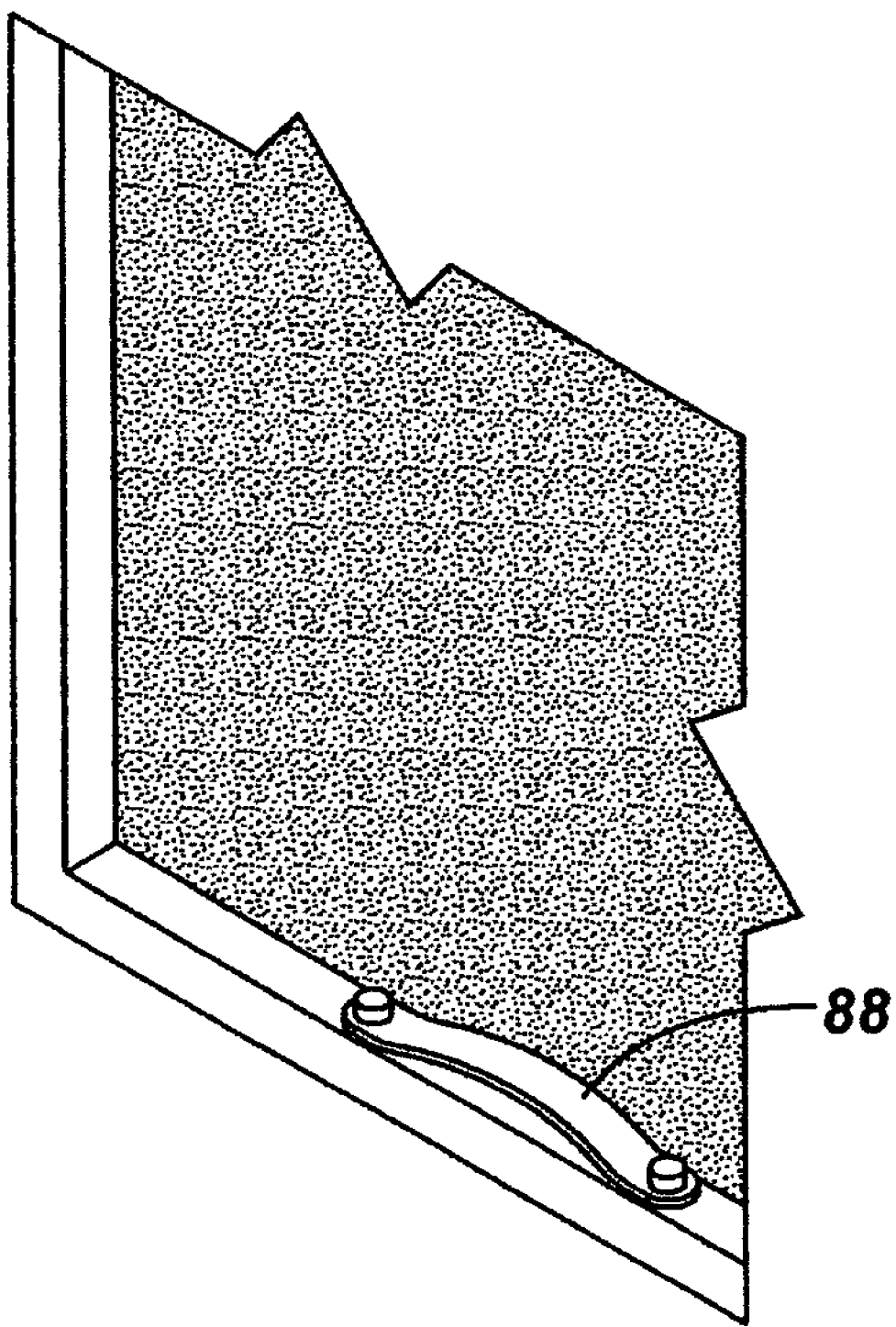
FIG. 11 is a detail of a portion of the inside of the blind assembly as shown in FIG. 2, for example.

For stabilizing the portable reconfigurable hunting blind loop means 88 are preferably provided at the lower end of the structure for receiving stakes to fasten the structure to the earth. See FIG. 11. Loop means can also be provided at the upper end of the structure for receiving guys for stabilizing the upper end of the structure against the wind.

The portable reconfigurable hunting blind assembly can also be opened up to form a curved wall. See FIG. 5. In this configuration, the assembly is useful for waterfowl hunters and other types of hunting, particularly those involving groups of hunters which need concealment from an open area.

Figure 12:
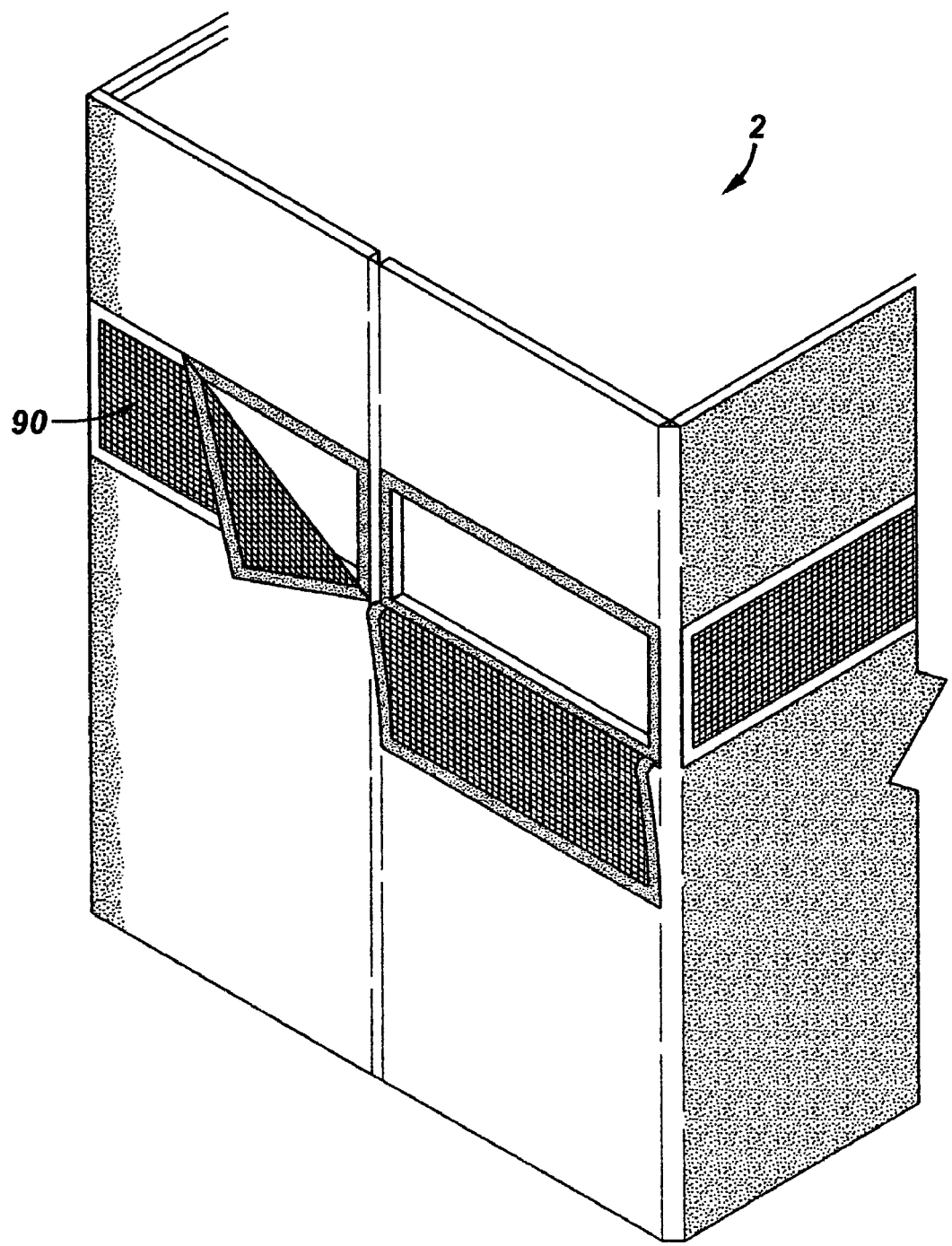
FIG. 12 is a detail of a portion of the outside of the blind assembly as shown in FIG. 4, for example, showing construction details.

The windows in the blind assembly are preferably covered by removable screens 90. See FIG. 12. The screens are preferably provided with fastener strips about their periphery which attach to peripheral strips around the window openings in the covering material. Hook and loop strips, such as Velcro brand fastener strips, are preferred.

While certain preferred embodiments of the invention have been described herein, the invention is not to be construed as being so limited, except to the extent that such limitations are found in the claims.

The invention claimed is:

1. A portable reconfigurable hunting blind assembly comprising:
   a. six rectangular frames joined together side edge to side edge along five hinge lines for accordion folding, and
   b. a camouflage covering mounted to each of the frames to define six panel-shaped wall units, said camouflage covering defining a window in at least some of said wall units, wherein the frames are identified as a first frame on a first end of the hunting blind assembly, a second frame adjacent to the first frame, a third frame adjacent to the second frame, a fourth frame adjacent to the third frame, a fifth frame adjacent to the fourth frame, and a sixth frame adjacent to the fifth frame, said sixth frame forming a second end of the hunting blind assembly, wherein the frames are attached by hinges along the five hinge lines, and said hinges are identified as a first hinge between the first and second panels, a second hinge between the second and third panels, a third hinge between the third and fourth panels, a fourth hinge between the fourth and fifth panels, and a fifth lunge between the fifth and sixth panels, wherein the second hinge permits the second frame and the third frame to swing over an angle of at least 270 degrees with respect to each other and the fourth hinge permits the fourth and fifth frames to swing over an angle of at least 270 degrees with respect to each other, wherein one of the frames further defines a door, wherein said assembly is configurable into a self-standing closed hexagonal structure and is reconfigurable into a self-standing four sided open ended pentagonal structure having two parallel sides leading to the open end
wherein the third and forth frames meet to form a rectangularly shaped window having a bottom edge partly formed by a removable rough sill element interconnecting fixed rough sill elements in the third frame and the fourth frame.

2. A portable reconfigurable hunting blind assembly as in claim 1 wherein the third and fourth frames meet to form a T shaped window having a downward extension defined between fixed sill elements in the third frame and fourth frame.

3. A portable reconfigurable hunting blind assembly as in claim 2 further comprising a first removable stiffener extending between the first frame and the sixth frame when the hunting blind assembly when configured as an open ended pentagonal structure and a second removable stiffener for extending between the first frame and the sixth frame when the hunting blind assembly is configured as an open ended pentagonal structure.

4. A portable reconfigurable hunting blind assembly as in claim 3 further comprising a roof covering positioned over a roof frame to form a roof, said covering having a periphery, a top side, and a bottom side, and a plurality of fasteners positioned on the bottom side around the periphery for attachment to a plurality of fasteners located on an outside surface of the hunting blind assembly near the upper end.

5. A portable reconfigurable hunting blind assembly as in claim 4 further comprising a curtain depending from one side of the roof covering positioned across the open end of the hunting blind assembly, said curtain carrying said at least two removable stiffeners.

6. A portable reconfigurable hunting blind assembly as in claim 1 wherein the removable rough sill element comprises a first arm section having a first end and a second end and a second arm section having a first end and a second end, the first end of the first arm section being pivotally connected to the first end of the second arm section, the second ends of both the first arm section and the second arm section being removably mounted to rough sill elements in the third frame and fourth frame, respectively.

7. A portable reconfigurable hunting blind assembly as in claim 6 further comprising a flap formed in the camouflage covering beneath the removable rough sill element to permit the window to be extending downwardly upon removal of the rough sill element.

* * * * *